US005101435A

United States Patent [19]

Carlson

[11] Patent Number: 5,101,435

[45] Date of Patent: Mar. 31, 1992

[54] COMBINED MICROPHONE AND MAGNETIC INDUCTION PICKUP SYSTEM

[75] Inventor: Elmer V. Carlson, Prospect Heights, Ill.

[73] Assignee: Knowles Electronics, Inc., Itasca, Ill.

[21] Appl. No.: 610,502

[22] Filed: Nov. 8, 1990

[51] Int. Cl.$^5$ ..................... H04R 25/00; H04M 11/00

[52] U.S. Cl. .................................... 381/68.6; 381/68; 381/68.5; 381/68.7; 379/52

[58] Field of Search ............... 128/419 R; 379/52, 55; 381/68, 68.5, 68.7, 68.6, 69, 150, 151, 168, 169, 192, 199, 201

[56] References Cited

U.S. PATENT DOCUMENTS

| | | | |
|---|---|---|---|
| 2,165,123 | 7/1939 | Ballantine | 381/151 |
| 3,396,245 | 8/1968 | Flygstad | 381/68.5 |
| 3,659,056 | 4/1972 | Morrison et al. | 455/41 |
| 4,912,769 | 3/1990 | Erbe | 381/68.7 |
| 5,010,575 | 4/1991 | Marutake et al. | 381/68 |

FOREIGN PATENT DOCUMENTS 0300748 12/1989 Japan .................................... 379/52

OTHER PUBLICATIONS

Omni Hearing Systems, "Model X312A", Dec. 1990.

*Primary Examiner*—James L. Dwyer
*Assistant Examiner*—William Cumming
*Attorney, Agent, or Firm*—Kinzer, Plyer, Dorn, McEachran & Jambor

[57] ABSTRACT

An ear insertable hearing aid having both a miniature microphone and a magnetic induction pickup which can be used simultaneously or alternately. The invention includes a core for the magnetic induction device that maximizes the surface area usable for sensing changes in magnetic flux but which is yet of a size that can act as a surrounding emplacement for the miniature microphone disposed between the plates of the substantially U-shaped core.

17 Claims, 2 Drawing Sheets

FIG. 6.
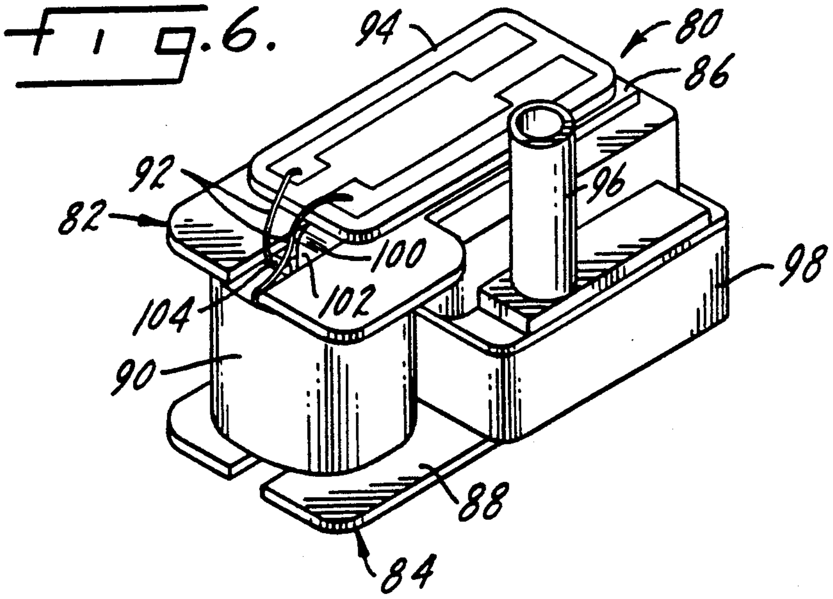
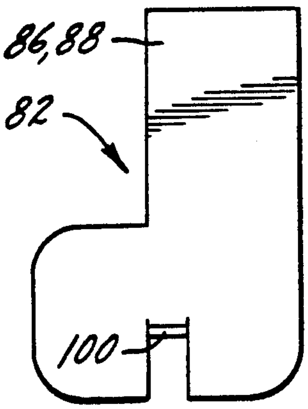
FIG. 7A.
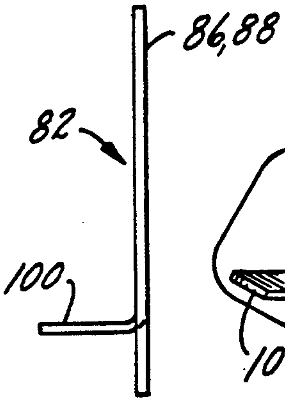
FIG. 7B.
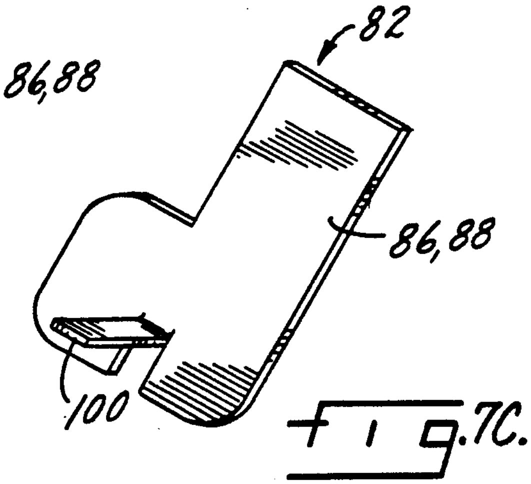
FIG. 7C.
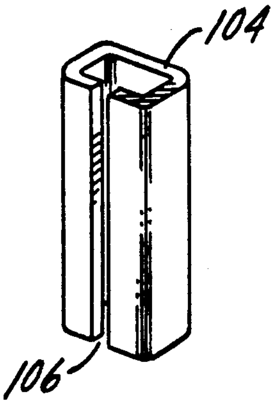
FIG. 8A.
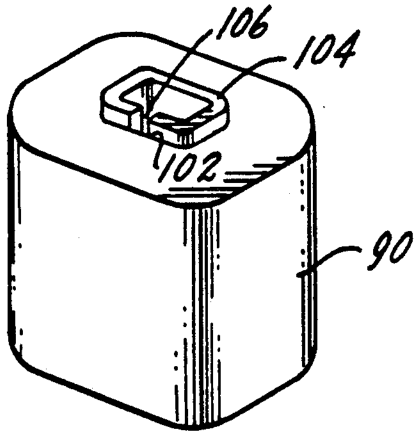
FIG. 8B.

COMBINED MICROPHONE AND MAGNETIC INDUCTION PICKUP SYSTEM

BACKGROUND OF THE INVENTION

1. Field of the Invention

This invention relates to hearing aids and more particularly relates to an ear-insertable hearing aid which includes both an acoustic microphone and a magnetic induction pickup.

2. Background

Miniaturization of hearing aids has been a goal for many years. More recently, hearing aids have been miniaturized to where they can be fully inserted into the ear so that the hearing aids are not visible except in a close-up, full profile view of the ear in which they have been inserted.

Another development in the hearing aid field has been to provide a combination microphone pickup and a magnetic induction pickup in the same device. The magnetic pickup or the microphone can be used simultaneously or alternatively. The magnetic induction pickup is normally used to develop an electrical signal from a magnetic flux field, such as the magnetic field of a telephone receiver. With such a device the hearing aid wearer can talk on the telephone and not be troubled by extraneous acoustic sounds. The device also prevents acoustic oscillations which are sometimes caused by the presence of the telephone close to the hearing aid. An alternative use for these induction devices is to assist the hard of hearing when listening to sound reinforcement systems. An example of this type of use is in conjunction with the magnetic field of a conductor loop in a classroom for the hearing impaired. A room (or a portion of it) is surrounded by the conductive loop, through which an electrical signal from a sound reinforcement system passes, creating a magnetic field which is sensed by the magnetic induction pickup. This enables the wearer to hear the sound system without being confused by acoustic reverberation in the room.

Examples of such devices are discussed in U.S. Pat. Nos. 3,396,245, 3,659,056 and 4,912,769. All of the devices discussed in these patents are too bulky to fit completely into the ear of a user.

SUMMARY OF THE INVENTION

It is a principal object of the invention to provide a miniature hearing aid that is compact, that comprises a unitary structure, that is fully insertable into the ear of a user, and that comprises both an acoustic microphone pickup and a magnetic induction pickup.

Another object of the present invention is to provide an improved magnetically permeable core for a hearing aid, small enough to fit in a human ear passage, which core surrounds other elements of the hearing aid but nevertheless provides an optimum size and configuration for detection of changes in magnetic flux in the area of the wearer's ear.

It is yet another object of this invention to provide a construction that is conservative of space in an in-the-ear type of hearing aid and still provide a usable sensitivity to the desired signal.

Another object of the invention is to provide a combination microphone and magnetic induction pickup in a unitary, compact device which maximizes the use of space and simultaneously is more miniature than comparable combination hearing devices heretofore know, yet still affords adequate sensitivity for use by a hearing impaired person.

Accordingly, the invention relates to a combination microphone and induction pickup, suitable for use in a miniature in-the-ear hearing aid, and which comprises a U-shaped magnetically permeable core having first and second leg portions connected by a bight portion, an electrical induction coil disposed in encompassing relation to the bight portion of the core, and a miniature microphone mounted between the legs of the core.

BRIEF DESCRIPTION OF THE DRAWINGS

FIG. 6 is a perspective view, like FIG. 4, of another embodiment of the invention;

FIGS. 7A and 7B are front and side elevation views and FIGS. 7C is a perspective view of a part of a core for the embodiment of FIG. 6; and FIGS. 8A and 8B are perspective views of a coil support and of a coil assembly, respectively, for use in various embodiments of the invention.

DETAILED DESCRIPTION OF THE DRAWINGS

Figure 1:
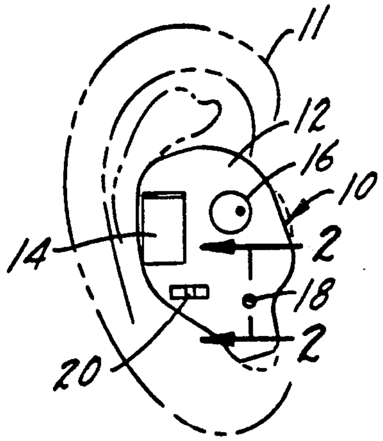
FIG. 1 is an elevation view of the inventive combination microphone and magnetic induction pickup in a hearing aid.

FIG. 1 illustrates the intended environment in which the invention is to be used. The ear 11 of a hearing aid user is shown in phantom; a hearing aid 10 has been inserted in ear 11. The outermost portion of hearing aid 10 is a faceplate 12. The faceplate 12 is provided with a battery access door 14, a volume control 16, and an opening 18 through which sound enters to impinge upon a hearing aid microphone, which is usually mounted immediately behind the faceplate 12. The faceplate also supports a switch 20 which can interchange between the various modes of utilizing the present invention.

Figure 2:
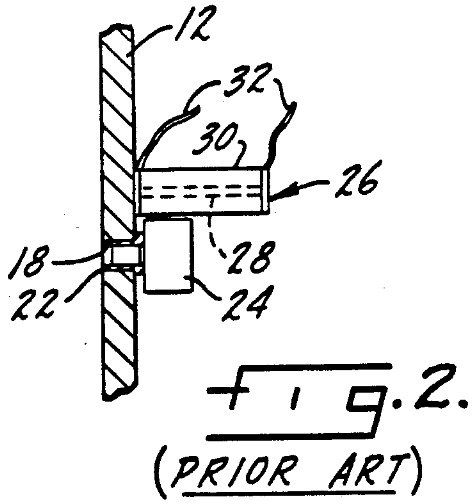
Fig. 2. (PRIOR ART)
FIG. 2 is a detail section view, on an enlarged scale, which illustrates a conventional arrangement for a microphone and magnetic pickup in a hearing aid, taken approximately along line 2—2 in FIG. 1.

FIG. 2 illustrates a conventional arrangement for incorporating a microphone and an induction pickup in a hearing aid. FIG. 2 illustrates a cross section of a part of the faceplate 12, including the opening 18 and a tubular member 22 which is disposed within opening 18. Tube 22 is directly connected to a microphone 24 that is disposed adjacent to a magnetic induction pickup 26. Tube 22 provides for passage of acoustic waves (sound) from outside the faceplate 12 to the microphone 24. Microphone 24 translates the acoustic waves into an electrical signal. The electrical signal is then amplified and further processed by the hearing aid and used to drive another transducer, a receiver (not shown), that produces sound in the ear canal of the user.

A second manner of electrical signal generation occurs in the conventional arrangement of FIG. 2, from the magnetic induction pickup 26. The conventional induction pickup 26 comprises a magnetically permeable rod 28 surrounded by a coil 30. Lead wires 32 from coil 30 are connected to an amplifier and to a receiver transducer (not shown); the amplifier and receiver are the same devices as those which are driven by the output signal from microphone 24. Switch 20, shown in FIG. 1, may be utilized to switch between operation in a microphone mode, or in an induction mode, depending upon the user's preference. As is apparent from FIG. 2, the microphone 24 and the magnetic pickup 26 are alongside each other; both are mounted on the faceplate 12.

Figure 3:
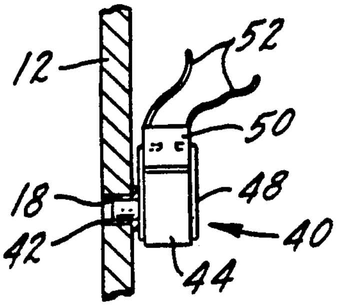
FIG. 3 is a detail section view, like FIG. 2, but illustrating one embodiment of the invention.
Figure 4:
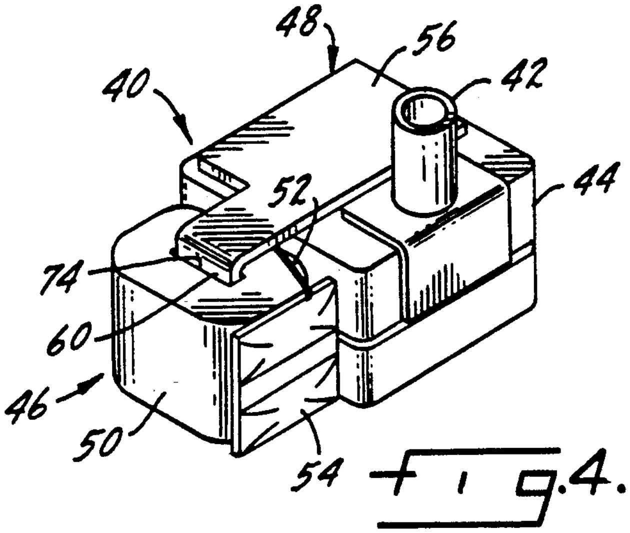
FIG. 4 is a perspective view, on a further enlarged scale, illustrating the embodiment of the invention from FIG. 3.
Figure 5A:
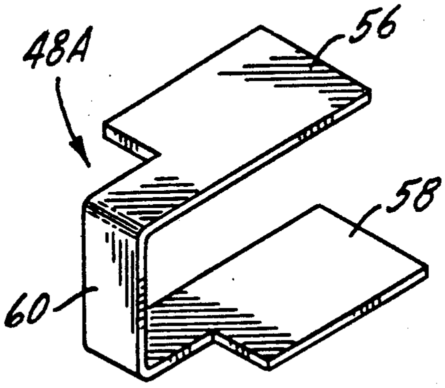
FIGS. 5A and 5B are perspective views of alternative core constructions that can be used in the embodiment of FIG. 4.
Figure 5B:
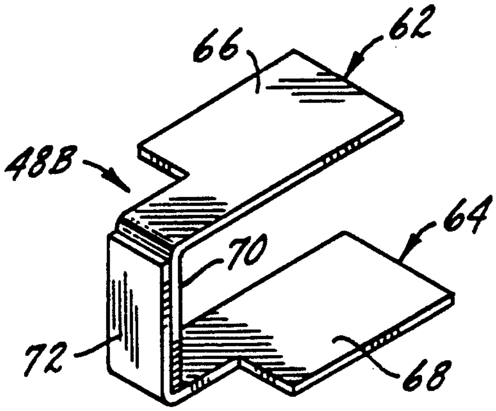

FIGS. 3 and 4 illustrate one embodiment of the present invention, a combination microphone and magnetic pickup device 40. An important advantage of combination 40 is the conservation of space, which results from a compact construction that incorporates a microphone and an induction pickup in the one composite device. In device 40, a tube 42 is disposed within the opening 18 in the hearing aid faceplate 12, as in the conventional hearing aid, and is directly connected to a microphone 44. The microphone 44, however, is incorporated in a superstructure which forms the core of an induction pickup 46. In pickup 46, FIG. 4, the conventional rod core is replaced by a U-shaped core 48. The constructions for the core 48 are illustrated in FIGS. 5A and 5B. Referring to FIGS. 3 and 4, a pickup coil 50 is wound about a central bight portion 60 of the core 48. The lead wires 52 of coil 50, shown loose in FIG. 3, are shown in FIG. 4 as being connected to a circuit board 54. The circuit board 54 may also provide electrical connections to the switch 20, the microphone 44 and an amplifier and receiver (not shown).

The core 48 is formed from a magnetically permeable material, such as a permalloy or similar material, and can take various shapes; alternate shapes 48A and 48B are illustrated in FIGS. 5A and 5B. In the configuration 48A of FIG. 5A, the core has two flat planar end portions or legs 56 and 58 that are substantially parallel to each other. The core end portions 56 and 58 are spaced from each other by a distance just sufficient to permit the microphone 44 to fit between them. The planar core end portions 56 and 58 are joined together by the central connecting portion or bight portion 60, which in the embodiment of FIG. 5A is integral with both of the planar core end portions 56 and 58. Preferably, the bight portion 60 is normal to each of the planar core end portions 56 and 58. The two flat planar core end portions 56 and 58 to some extent enclose and support the microphone 44 and a part of the pickup coil 50. As previously noted, coil 50 is mounted on the connecting core portion 60.

In the core 48B of FIG. 5B, there are two similar but separate core members 62 and 64. These core members afford two flat, planar core portions or legs 66 and 68, and two connecting pieces 70 and 72. The core member 64 is shown as having the same shape as member 62; member 64 being merely rotated 180° around an axis parallel to the longitudinal direction of the flat planar portion or leg 66. The core members 62, 64 are shown similar in shape as a result of manufacturing convenience, but different shapes for the core members may be used. The connecting portions 70 and 72 are brought together as shown in FIG. 5B. The end result is a core 48B that has an overall shape quite similar to the core 48A shown in FIG. 5A. With core 48B, FIG. 5B, the coil 50 (see FIG. 4) can be wound separately, after which the connecting portions 70 and 72 of the core are inserted through the central aperture 74 in the coil. A slight air gap may be present between the connecting core pieces 70 and 72, which will not greatly affect the operation of induction pickup 46, FIG. 4.

The two cores 48A and 48B illustrated in FIGS. 5A and 5B are similar to each other in shape and operate in an almost identical manner. They each act to sense and monitor changes in magnetic flux passing through the flat planar core end portions 56,58 and 66,68. The core end portions 56 and 58 of FIGS. 4 and 5A, and the similar core elements 66 and 68 of FIG. 5B, provide wide areas for sensing magnetic flux changes, much greater than the area provided by the conventional rod 28 shown in FIG. 2. Sensitivity to changes in magnetic field strength is proportional to the area of the portion which is subject to the magnetic flux passing through it. The greater the area of the magnetically permeable portion susceptible to receiving a magnetic field, the greater the sensitivity to changes in the magnetic field. For the conventional rod core 28 of FIG. 2, which has only a limited portion which is susceptible to reception of a magnetic field, the electrical signal generated by the coil 30 surrounding the rod 28 is relatively weak and sometimes indistinct. Sensitivity also directly depends on orientation of the rod 28 with respect to the magnetic flux; cores 48A and 48B are less sensitive to orientation difficulties.

An advantage which the core 48B of FIG. 5B has over the core 48A of FIG. 5A is it enhances the ability to more easily and efficiently assemble the combination device. Assembly of a pickup that uses the core 48A of FIG. 5A requires that the coil 50 be wound around the core bight 60 following manufacture of the core 48A. Although the core 48A may provide slightly better performance and sensitivity than does core 48B, there is a tradeoff in the time and difficulty in the winding of the coil 50.

Individual core members 62,64, as shown in FIG. 5B, provide for more efficient manufacture and assembly of the combination device. The overall shape of each of these core members is similar to one half of the core member 48A of FIG. 5A. The manufacture of the core members 62 and 64 is similar to but simpler and less expensive than the manufacture of core member 48A. Punching a cutout part from magnetically permeable material, and bending the metal to provide the connecting pieces 70 and 72 results in parts that are ready for assembly into the induction device. The difference in the assembly between the two embodiments is that the coil 50 need not be wound around core members 62 and 64, as is necessary in the assembly of core member 48A, so that winding the coil can be completed before assembly. The connecting pieces 70 and 72 may be inserted within the opening or through hole 74 around which the coil 50 is wound. Winding of the coil around a specially designed form or blank, (discussed below) and inserting the two connecting pieces into through hole 74 is much easier and faster than the winding of the coil around core 48A. Moreover, assembly of the microphone portion of the device is easier before the planar portions 66 and 68 of core 48B are in position.

FIGS. 6 and 7A–7C illustrate another combination device 80 according to the invention, utilizing two similarly shaped core members 82 and 84, similar in operation to the first and second core members 62 and 64 of FIG. 5B, and which together form the core for the device 80. In the device 80 of FIGS. 6 and 7A–7C, however, the planar leg portions 86 and 88 of the first and second core members 82 and 84, respectively, are essentially coextensive with and effectively support all of the components of the combination device. Those components comprise the pickup coil 90, having lead wires 92, an integrated circuit 94, a microphone input tube 96, and a microphone 98. Each of the core members 82 and 84 also includes a connecting or tang portion 100, best illustrated in FIGS. 7A-7C. The two tang portions 100 are each inserted into a hole 102 in coil 90.

The method of manufacture of core members 82 and 84 of device 80 may be somewhat different from that of the corresponding members 62 and 64 of core 48B. This results from the more central location of the bend forming the connecting portion or tang 100, which first must be cut from the sheet metal comprising the core member blank and then bent to a 90° angle. Following assembly of the remaining elements of the combination device, including the coil 90 and microphone 98, the connecting portions 100 of each of the core members 82 and 84 are inserted into the through hole 102 at either axial end of coil 90; see FIGS. 8A and 8B. A small air gap may be allowed between the connecting core portions or tangs 100, which will not significantly impair the performance of the magnetic pickup.

The lead wires 92 then can be soldered to a circuit board 94, which is attached to the outside surface of planar core portion 84, by an adhesive or other appropriate means. A section of planar portion 84 can be removed to permit access of the microphone input tube 96. The tube 96 has a length sufficient to permit it to extend through the opening 18 in the wall of faceplate 12; see FIGS. 1 and 3.

Another aspect of the invention is illustrated in FIGS. 8A and 8B and is visible upon close examination of FIG. 6. Winding of the very thin wire which forms the coil 90 is best done around a support form or blank. FIG. 8A illustrates such a form 104, preferably formed of a magnetically permeable material around which the coil 90 is wound. FIG. 8B shows the coil 90 wound on the support form 104, with form 104 filling and defining the hole through the coil. The coil is then ready for assembly in one of the combination magnetic pickup and microphone devices shown in FIGS. 4 and 6.

The form 104 preferably is generally tubular. In a preferred embodiment it may include a longitudinal slot 106. Winding of the coil 90 around the form 104 may bring the ends of the form 104 closer together and narrow the width of the slots 106 to some degree.

The tubular coil form 104 provides a number of advantages. The form 104 in coil 90, as shown in FIG. 8B, provides a smooth surface for the insertion of legs 70,72 or tangs 100 into the coil. Ideally, the dimensions of the legs 70,72 or tangs 100 will be approximately equal to the inside dimension of the inner diameter of the form 104. Insertion of the legs 70,72 or tangs 100 into the form 104 can thus provide a friction fit which will be sufficient to retain the core legs or tangs within the central core opening 102 following the assembly of the combination magnetic pickup and microphone device. The form 104 will also protect the thin stands of wire comprising coil 90 from abrasion during the assembly process. Another advantage is that magnetic coupling between the legs 100 and planar core portions 86 and 88 can be increased by using magnetically permeable material for the coil support form 104.

Several advantages are provided by the combination acoustic microphone and magnetic pickup device illustrated in FIG. 6. The larger surface area of the planar core portions 86 and 88 provide greater sensitivity to changes in magnetic flux, without necessitating any increase in the total size of the unit. The circuit board 94 is mounted directly on the outer surface of the core member 86; it does not affect the performance of the magnetic induction pickup coil 90. The outer edges of planar portions 82 and 84 of core 88 to some extent overlie the coil 90 and the microphone 98, providing a protective function for those elements. The size and shape of the planar core portions 86 and 88 are as large as the microphone dimensions will permit, consequently providing an optimum balance between minimum size and optimal performance of the device 80.

It is to be understood that the above descriptions of the preferred embodiments are merely illustrative of the invention, and that various changes and modifications may be made by those skilled in the art without departing from the scope of the claims.

I claim:

1. A combination microphone and induction pickup, suitable for use in a miniature hearing aid, comprising:
- a U-shaped magnetically permeable core having first and second leg portions connected by a bight portion;
- an electrical induction coil disposed in encompassing relation to the bight portion of the core;
- and a miniature microphone mounted between the legs of the core.

2. A combination microphone and induction pickup according to claim 1 in which each leg of the magnetic core is a thin, flat plate covering a major portion of one side of the microphone.

3. A combination microphone and induction pickup according to claim 1 in which the core is formed by two core members, each core member including one leg portion and a bight portion projecting from one end of the leg portion, and in which the bight portions of the two core members overlap each other within the coil.

4. A combination microphone and induction pickup according to claim 3 in which the bight portions of the two core members overlap each other throughout their lengths within the coil.

5. A combination microphone and induction pickup according to claim 4 in which each leg of the magnetic core is a thin, flat plate covering a major portion of one side of the microphone.

6. A combination microphone and induction pickup according to claim 3 in which the two core members have the same configuration.

7. A combination microphone and induction pickup according to claim 5 in which the bight portion of each core member is substantially narrower than the overall width of the leg portion of the core member.

8. A combination microphone and induction pickup according to claim 7 in which the leg portion of each core member is generally L-shaped and projects laterally predominantly from one side of the bight portion of that core member, so that the wider parts of the leg portions project oppositely away from a center plane for the core.

9. A combination microphone and induction pickup according to claim 7 in which the bight portion of each core member is formed by cutting and bending a tang from one end of the leg portion of that core member.

10. A combination microphone and induction pickup according to claim 9 in which the leg portion of each core member is generally L-shaped.

11. A combination microphone and induction pickup according to claim 1 in which the entire magnetic core is formed from a single sheet of magnetically permeable metal cut and bent to afford the desired configuration.

12. A combination microphone and induction pickup according to claim 11 in which each leg of the magnetic core covers a major portion of one side of the microphone.

13. A combination microphone and induction pickup according to claim 1 and further comprising a circuit board, mounted on one of the core leg portions on the side thereof opposite the microphone and electrically connected to the coil and the microphone.

14. A combination microphone and induction pickup according to claim 3 and further comprising a tubular magnetically permeable auxiliary core disposed centrally of and supporting the coil, the auxiliary core being disposed in encompassing relation to the bight portions of the two core members.

15. A combination microphone and induction pickup according to claim 14 in which each leg of the magnetic core is a thin, flat plate covering a major portion of one side of the microphone.

16. A combination microphone and induction pickup according to claim 15 in which the two core members have the same configuration.

17. A combination microphone and induction pickup according to claim 16 in which the bight portion of each core member is substantially narrower than the overall width of the leg portion of the core member.

* * * * *